United States Patent
Iida et al.

(10) Patent No.: US 7,800,887 B2
(45) Date of Patent: Sep. 21, 2010

(54) SOLID ELECTROLYTIC CAPACITOR AND METHOD FOR PRODUCING THE SAME

(75) Inventors: Takahisa Iida, Tottori (JP); Mutsumi Yano, Hirakata (JP); Takashi Umemoto, Hirakata (JP); Hiroshi Nonoue, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 205 days.

(21) Appl. No.: 11/846,015

(22) Filed: Aug. 28, 2007

(65) Prior Publication Data
US 2008/0316680 A1    Dec. 25, 2008

(30) Foreign Application Priority Data
Aug. 30, 2006    (JP)    ............... 2006-233690

(51) Int. Cl.
*H01G 9/02*    (2006.01)
*H01G 9/00*    (2006.01)
(52) U.S. Cl. ........................ 361/525; 361/523
(58) Field of Classification Search ................. 361/525, 361/523
See application file for complete search history.

(56) References Cited

U.S. PATENT DOCUMENTS

| | | | |
|---|---|---|---|
| 6,215,651 B1 * | 4/2001 | Takada et al. | 361/523 |
| 6,430,033 B1 * | 8/2002 | Mitsui et al. | 361/525 |
| 6,473,293 B2 * | 10/2002 | Shimada et al. | 361/523 |
| 7,126,812 B2 * | 10/2006 | Hirata et al. | 361/524 |
| 7,180,728 B2 * | 2/2007 | Kobayashi | 361/524 |
| 2005/0288427 A1 * | 12/2005 | Jeon et al. | 524/555 |
| 2006/0082951 A1 * | 4/2006 | Hirata et al. | 361/524 |
| 2006/0084237 A1 * | 4/2006 | Kobayashi | 438/381 |
| 2006/0221549 A1 * | 10/2006 | Iida et al. | 361/313 |

FOREIGN PATENT DOCUMENTS

| | | |
|---|---|---|
| JP | 4-48710 | 2/1992 |
| JP | 10-92699 | 4/1998 |
| JP | 10-321471 | 12/1998 |
| JP | 2005197587 A * | 7/2005 |

* cited by examiner

*Primary Examiner*—Eric Thomas
*Assistant Examiner*—David M Sinclair
(74) *Attorney, Agent, or Firm*—Ditthavong, Mori & Steiner, P.C.

(57) ABSTRACT

A solid electrolytic capacitor, having a small equivalent series resistance, is formed by burying a capacitor element inside an epoxy resin outer package. The capacitor element includes an anode, having part of an anode lead buried therein, a dielectric layer formed on the anode and containing a niobium oxide, and a cathode formed on the dielectric layer. The cathode includes a first electrolyte layer containing a conductive polymer and formed on the dielectric layer, an intermediate layer containing an organic silane and formed on the first electrolyte layer, a second electrolyte layer containing a conductive polymer and formed on the intermediate layer, a first conductive layer containing carbon particles and formed on the second electrolyte layer, and a second conductive layer containing silver particles and formed on the first conductive layer.

4 Claims, 3 Drawing Sheets

SOLID ELECTROLYTIC CAPACITOR AND METHOD FOR PRODUCING THE SAME

BACKGROUND OF THE INVENTION

1. Field of the Invention

The present invention relates to a solid electrolytic capacitor and a method for producing the same.

2. Description of the Related Art

Conventionally, solid electrolytic capacitors having a small equivalent series resistance (ESR) have been known (see, for example, Japanese Unexamined Patent Publication Nos. 4-48710, 10-92699 and 10-321471).

Figure 9:
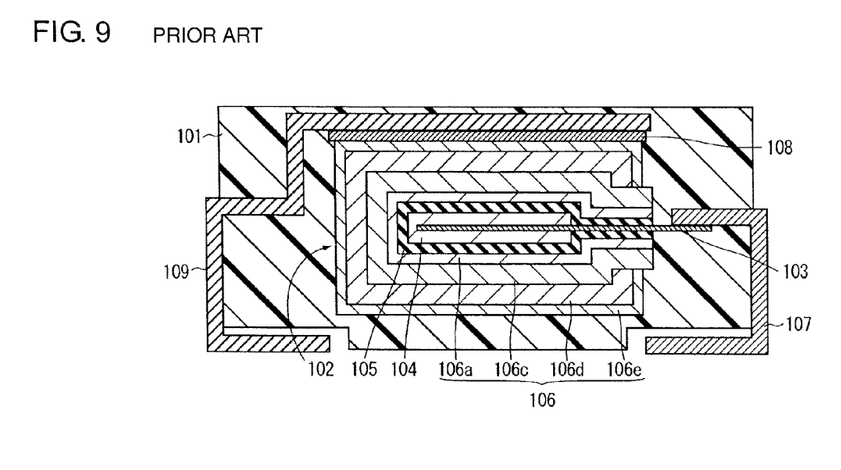
FIG. 9 is a sectional view for explaining the structure of a conventional solid electrolytic capacitor.

FIG. 9 is a sectional view for explaining the structure of a conventional solid electrolytic capacitor. The structure of this conventional solid electrolytic capacitor will be explained with reference to FIG. 9.

In the conventional solid electrolytic capacitor, as shown in FIG. 9, a capacitor element 102 is buried in a rectangular parallelepiped-like outer package 101.

The capacitor element 102 is provided with an anode 104 in which a part of an anode lead 103 is buried and which is made of a porous sintered body of tantalum particles, a dielectric layer 105 containing a tantalum oxide formed on the anode 104 and a cathode 106 formed on the dielectric layer 105.

The anode lead 103 is constituted of tantalum, wherein one end of the anode lead 103 is buried in the center of the anode 104 and one end of an anode terminal 107 is connected to the other end of the anode lead 103 exposed from the anode 104. Also, the other end of the anode terminal 107 is exposed from the outer package 101.

The cathode 106 comprises a first electrolyte layer 106a made of polyethylenedioxythiophene (PEDOT) formed on the dielectric layer 105, a second electrolyte layer 106c which is made of polypyrrole (PPy) and formed on the first electrolyte layer 106a, a first conductive layer 106d which is formed on the second electrolyte layer 106c and contains carbon particles and a second conductive layer 106e which is formed on the first conductive layer 106d and contains silver particles.

One end of a cathode terminal 109 is connected to the surface of the cathode 106 through a third conductive layer 108 containing silver particles and the other end of the cathode terminal 109 is exposed from the outer package 101. The conventional solid electrolytic capacitor is thus constituted.

Next, a process for producing the conventional solid electrolytic capacitor will be explained with reference to FIG. 9.

In the case of the conventional solid electrolytic capacitor, first, a rectangular parallelepiped-like molded article is formed from tantalum particles and also, one end of the anode lead 103 is buried in this molded article. Next, this molded article is sintered under vacuum to thereby form the anode 104 in which a part of the anode lead 103 is buried.

Then, the anode 104 is subjected to anodic oxidation carried out in an aqueous phosphoric acid solution to form the dielectric layer 105 made of a tantalum oxide on the surface of the anode 104.

Next, the first electrolyte layer 106a made of PEDOT is formed on the dielectric layer 105 by chemical polymerization of ethylenedioxythiophene (EDOT). Moreover, the second electrolyte layer 106c made of PPy is formed on the first electrolyte layer 106a by electrolytic polymerization of pyrrole (Py). Also, a carbon paste containing carbon particles is applied to the second electrolyte layer 106c and dried to thereby form the first conductive layer 106d containing carbon particles on the second electrolyte layer 106c. Further, a silver paste containing silver particles is applied to the first conductive layer 106d and dried to form the second conductive layer 106e containing silver particles on the first conductive layer 106d. The capacitor element 102 provided with the cathode 106 including these layers 106a, 106c, 106d and 106e on the dielectric layer 105 is thus formed.

Next, the anode terminal 107 is connected to the anode lead 103 exposed from the anode 104 by welding. Also, the cathode 106 and the cathode terminal 109 are dried in the condition that the both are stuck to each other through a silver paste containing silver particles to thereby form the third conductive layer 108 containing silver particles between the cathode 106 and the cathode terminal 109 and also, the cathode 106 is connected to the cathode terminal 109 through the third conductive layer 108.

Finally, the capacitor element 102 to which the anode terminal 107 and the cathode terminal 109 are connected is buried in a resin composition and this resin composition is heat-cured to form the outer package 101 provided with the buried capacitor element 102. The conventional solid electrolytic capacitor is manufactured by the above method.

SUMMARY OF THE INVENTION

However, in the foregoing conventional solid electrolytic capacitor, contact resistance between the first electrolyte layer 106a and the second electrolyte layer 106c tends to be large, giving rise to a problem that it is difficult to further decrease ESR in, particularly, a high frequency range.

The present invention has been made to solve the problem as mentioned above and it is an object of the present invention to provide a solid electrolytic capacitor having a small equivalent series resistance.

Another object of the present invention is to provide a method for producing a solid electrolytic capacitor having a small equivalent series resistance.

According to a first aspect of the present invention, there is provided a solid electrolytic capacitor comprising an anode, a dielectric layer formed on the anode and a cathode formed on the dielectric layer, wherein the cathode is provided with a first electrolyte layer formed on the dielectric layer and containing a conductive polymer, an intermediate layer formed on the first electrolyte layer and containing organic silane and a second electrolyte layer formed on the intermediate layer and containing a conductive polymer.

In the solid electrolytic capacitor according to the first aspect, the intermediate layer preferably contains at least one organic silane selected from the group consisting of aminopropyltriethoxysilane (APTES), octadecyltriethoxysilane (OTES), n-propyltrichlorosilane (nPTCS), dimethoxydiphenylsilane (DMDPS), methylphenyldichlorosilane (MPDCS) and mercaptopropyltrimethoxysilane (MPTMS).

In the solid electrolytic capacitor according to the first aspect, the first electrolyte layer preferably contains polyethylenedioxythiophene (PEDOT) and the second electrolyte layer contains polypyrrole (PPy).

According to a second aspect of the present invention, there is provided a method for producing a solid electrolytic capacitor, the method comprising a step of forming a dielectric layer on an anode and a step of forming a cathode on the dielectric layer, wherein the step of forming a cathode includes a step of forming a first electrolyte layer containing a conductive polymer on the dielectric layer, a step of drying a solution containing organic silane stuck to the first electrolyte layer to form an intermediate layer containing organic silane on the first electrolyte layer and a step of forming a second electrolyte layer containing a conductive polymer on the intermediate layer.

In the method for producing a solid electrolytic capacitor according to the second aspect, the step of forming the first electrolyte layer preferably includes a step of forming the first electrolyte layer by chemical polymerization and the step of forming the second electrolyte layer preferably includes a step of forming the second electrolyte layer by electrolytic polymerization. In the present invention, the term "chemical polymerization" means a polymerization reaction by an oxidation reaction using an oxidant and the term "electrolytic polymerization" means a polymerization reaction induced by an electrode reaction.

In the present invention, the intermediate layer containing organic silane is formed between the first and second electrolyte layers containing a conductive polymer, thereby improving adhesion between the first and second electrolyte layers. This reduces contact resistance between the first and second electrolyte layers, making it possible to reduce ESR in a high frequency range. As a result, a solid electrolytic capacitor having a small ESR can be obtained.

As the organic silane contained in the intermediate layer, a methyl type, phenyl type, vinyl type, alkoxy type, mercapto type or amino type silane may be used. Particularly, the amount of ESR can be easily reduced by using at least one organic silane selected from the group consisting of APTES, OTES, nPTCS, DMDPS, MPDCS and MPTMS.

Also, ESR can be further reduced by using PEDOT having high conductivity to form the first electrolyte layer and by using a highly conductive PPy produced by electrolytic polymerization to form the second electrolyte layer.

Also, after the first electrolyte layer is formed, an organic silane solution is applied and dried, whereby an intermediate layer containing the organic silane can be easily formed on the first electrolyte layer. Also, adhesion between the first and second electrolyte layers can be easily improved by forming the second electrolyte layer on the intermediate layer.

Also, adhesion between the dielectric layer and the first electrolyte layer can be improved by forming the first electrolyte layer by chemical polymerization. Also, a highly conductive second electrolyte layer can be formed by forming the second electrolyte layer by electrolytic polymerization.

DETAILED DESCRIPTION OF THE PREFERRED EMBODIMENTS

An embodiment of the present invention will be explained with reference to the drawings.

First Embodiment

Figure 1:
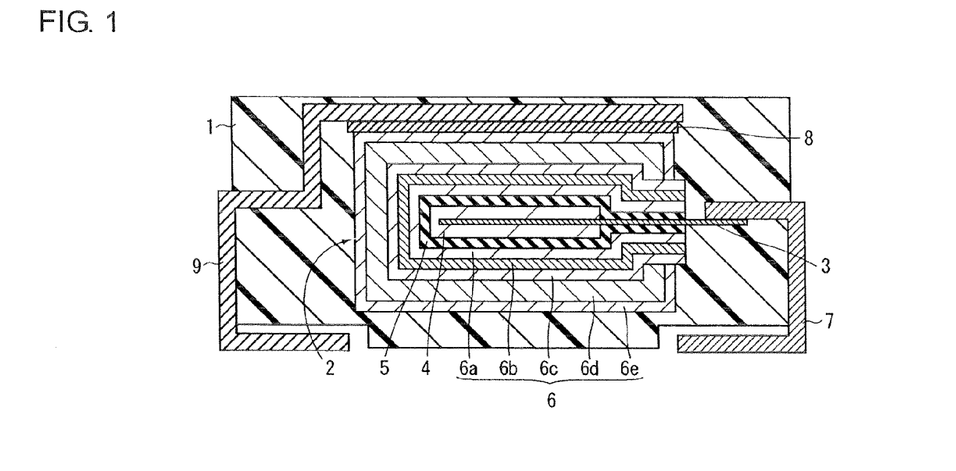
FIG. 1 is a sectional view for explaining the structure of a solid electrolytic capacitor according to a first embodiment of the present invention.

FIG. 1 is a sectional view for explaining the structure of a solid electrolytic capacitor according to a first embodiment of the present invention. The structure of the solid electrolytic capacitor according to the first embodiment of the present invention will be explained with reference to FIG. 1.

In the solid electrolytic capacitor according the first embodiment of the present invention, a capacitor element 2 is buried in an outer package 1 having a rectangular parallelepiped-like form and primarily made of an epoxy resin as shown in FIG. 1.

The capacitor element 2 is provided with an anode 4 in which a part of an anode lead 3 is buried and which is constituted of a porous sintered body of a valve metal such as tantalum or niobium, a dielectric layer 5 which is formed on the anode 4 and contains an oxide of the above valve metal and a cathode 6 formed on the dielectric layer 5.

One end of the anode lead 3 is buried in the center of the anode 4, and one end of the anode terminal 7 is connected to the other end of the anode lead 3 exposed from the anode 4. Also, the other end of the anode terminal 7 is exposed from the outer package 1.

The cathode 6 includes a first electrolyte layer 6a which is formed on the dielectric layer 5 and contains a conductive polymer such as polyethylenedioxythiophene (PEDOT) or polypyrrole (PPy), an intermediate layer 6b which is formed on the first electrolyte layer 6a and contains organic silane such as aminopropyltriethoxysilane (APTES), a second electrolyte layer 6c which is formed on the intermediate layer 6b and contains a conductive polymer such as PEDOT or PPy, a first conductive layer 6d which is formed on the second electrolyte layer 6c and contains carbon particles and a second conductive layer 6e which is formed on the first conductive layer 6d and contains silver particles. Also, the first electrolyte layer 6a is formed so as to substantially cover the entire surface of the dielectric layer 5 almost uniformly, and the intermediate layer 6b is formed so as not to be brought into contact with the dielectric layer 5. Also, the intermediate layer 6b is formed so as to substantially cover the entire surface of the first electrolyte layer 6a almost uniformly and the second electrolyte layer 6c is formed so as not to be brought into contact with the first electrolyte layer 6a.

One end of a cathode terminal 9 is connected with the cathode 6 through a third conductive layer 8 containing silver particles and the other end of the cathode terminal 8 is exposed from the outer package 1. The solid electrolytic capacitor of Example 1 according to the present invention is thus constituted.

A process for producing the solid electrolytic capacitor according to the first embodiment of the present invention will be explained with reference to FIG. 1.

In the production of the solid electrolytic capacitor according to the first embodiment of the present invention, first a rectangular parallelepiped-shape is molded out of particulate valve metals such as tantalum particles or niobium particles and also, one end of the anode lead 3 is buried in the molded article. Next, this molded article is sintered under vacuum to form the anode 4 in which a part of the anode lead 3 is buried.

Next, the anode 4 is dipped in an electrolyte solution such as phosphoric acid aqueous solution and voltage is applied to the anode 4 to carry out anodic oxidation. This process results in the formation of the dielectric layer 5 containing an oxide of a valve metal on the surface of the anode 4 so as to substantially cover the entire surface of the anode 4 almost uniformly.

Next, the anode 4 provided with the dielectric layer 5 formed on its outermost surface is dipped in a solution containing a monomer such as ethylenedioxythiophene (EDOT) or pyrrole (Py), an oxidant such as p-toluenesulfonic acid, a solvent such as n-butanol and pure water, followed by drying to carry out chemical polymerization. The first electrolyte layer 6a containing a conductive polymer such as PEDOT or PPy is thus formed on the dielectric layer 5 in such a manner that it substantially covers the entire surface of the dielectric layer 5 almost uniformly. Since the dielectric layer 5 is formed between the anode 4 and the first electrolyte layer 6a, the anode 4 is not in contact with the first electrolyte layer 6a.

Next, the anode 4 provided with the first electrolyte layer 6a formed on its outermost surface is dipped in a solution containing organic silane such as APTES, followed by drying. The intermediate layer 6b containing organic silane such as APTES is thus formed on the first electrolyte layer 6a in such a manner that it substantially covers the entire surface of the first electrolyte layer 6a almost uniformly. Also, since the first electrolyte layer 6a is formed between the dielectric layer 5 and the intermediate layer 6b, the dielectric layer 5 is not in contact with the intermediate layer 6b.

Then, the anode 4 provided with the intermediate layer 6b formed on its outermost surface is dipped in an aqueous solution containing a monomer such as EDOT or Py and an additive such as naphthalenesulfonic acid and voltage is applied to the anode 4 to run electrolytic polymerization. The second electrolyte layer 6c containing a conductive polymer such as PEDOT or PPy is thus formed on the intermediate layer 6b in such a manner that it substantially covers the entire surface of the intermediate layer 6b almost uniformly. Also, since the intermediate layer 6b is formed between the first electrolyte layer 6a and the second electrolyte layer 6c, the first electrolyte layer 6a is not in contact with the second electrolyte layer 6c.

Then, a carbon paste containing carbon particles is applied to the second electrolyte layer 6c in such a manner as to cover almost the entire surface of the second electrolyte layer 6c, followed by drying. This results in the formation of the first conductive layer 6d containing carbon particles on the second conductive polymer layer 6c. Moreover, a silver paste containing silver particles is applied to the first conductive layer 6d in such a manner as to cover almost the entire surface of the first conductive layer 6d, followed by drying. The second conductive layer 6e containing silver particles is thus formed on the first conductive layer 6d. The foregoing processes result in the production of the capacitor element 2 formed with the cathode 6 constituted of the layers 6a to 6e on the dielectric layer 5.

Next, the anode terminal 7 is connected with the anode lead 3 exposed from the anode 4 by welding. Also, the cathode 6 and the cathode terminal 9 are put into a close contact state through the silver paste containing silver particles to carry out drying, whereby the third conductive layer 8 containing silver particles is formed between the cathode 6 and the cathode terminal 9 and also, the cathode 6 is connected with the cathode terminal 9 through the third conductive layer 8.

Finally, the capacitor element 2 with which the anode terminal 7 and the cathode terminal 9 are connected is buried in a resin composition such as an epoxy resin and this resin composition is thermally cured to form the outer package 1 in which the capacitor element 2 is buried. Thus, the solid electrolytic capacitor according to the first embodiment of the present invention is manufactured by the above method.

In this solid electrolytic capacitor of this embodiment, the intermediate layer 6b containing organic silane is formed between the first electrolyte layer 6a and second electrolyte layer 6c containing a conductive polymer to thereby improve adhesion between the first electrolyte layer 6a and the second electrolyte layer 6c. This reduces contact resistance between the first electrolyte layer 6a and the second electrolyte layer 6c and it is therefore possible to decrease ESR in a high-frequency range.

Also, in this embodiment, organic silane can be uniformly stuck even to pores inside of the anode 4 constituted of a porous sintered body by dipping the first electrolyte layer 6a in a solution containing the organic silane after the first electrolyte layer 6a is formed. Moreover, the solution containing the organic silane which is stuck to the first electrolyte layer 6a is dried, thereby enabling the intermediate layer 6b containing the organic silane to be formed easily on the first electrolyte layer 6a. Also, adhesion between the first electrolyte layer 6a and the second electrolyte layer 6c can be easily improved by forming the second electrolyte layer 6c on the intermediate layer 6b.

Also, the first electrolyte layer 6a is formed so as to substantially cover the entire surface of the dielectric layer 5 almost uniformly and therefore, the intermediate layer 6b relatively inferior in adhesion is not brought into contact with the dielectric layer 5. As a result, the dielectric layer 5 is hardly peeled from the cathode 6 even in the case of carrying out heat treatment such as reflow soldering treatment when the solid electrolytic capacitor is surface-packaged on a print board or the like and therefore, ESR can be further reduced.

Also, in this embodiment, the first electrolyte layer 6a is formed by chemical polymerization, thereby making it possible to improve adhesion between the dielectric layer 5 and the first electrolyte layer 6a. The second electrolyte layer 6c having high conductivity can be formed by forming the second electrolyte layer 6c by electrolytic polymerization.

Also, in this embodiment, the electrolytic capacitor element 2 is covered with the outer package 1 to make a highly reliable solid electrolytic capacitor resistant to the influence of the environment.

Next, comparative experiments as shown below were conducted to confirm the effect of the solid electrolytic capacitor according to the first embodiment.

Experiment 1

In Experiment 1, solid electrolytic capacitors A1 to A5 having the structures shown in Table 1 were manufactured.

Here, the anode 4 was formed from a porous sintered body of tantalum or niobium particles. For the anode lead 3, a metal line made from tantalum was used.

Also, each anode 4 was dipped in an aqueous solution containing about 0.1 wt % of phosphoric acid which was kept at about 60° C. and a fixed voltage of about 8 V was applied to the anode 4 for about 10 hours to from the dielectric layer 5 made of a tantalum oxide or niobium oxide.

Also, the first electrolyte layer 6a was formed by chemical polymerization in the following manner. First, the anode 4 provided with the dielectric layer 5 on its outermost surface was dipped in a solution containing about 10 wt % of EDOT or Py, about 30 wt % of p-toluenesulfonic acid, about 40 wt % of n-butanol and about 20 wt % of pure water for 10 minutes. Next, the anode 4 was taken out of this solution and heated at about 80° C. for about 15 minutes to dry. Further, the unreacted solution was removed by washing with water and the anode was heated at about 90° C. for about 10 minutes to dry. By this process, the first electrolyte layer 6a containing PEDOT or PPy was formed on the dielectric layer 5.

Also, the intermediate layer 6b made of APTES was formed in the following manner. First, the anode 4 provided with the first electrolyte layer 6a formed on its outermost surface was dipped in an aqueous solution containing about 0.002 wt % of APTES for about 10 minutes. Next, the anode 4 was taken out of the solution, washed with water and then heated at about 60° C. for about 10 minutes. The intermediate 6b including APTES was formed on the first electrolyte layer 6a in such a manner that it was not in contact with the dielectric layer 5.

Also, the second electrolyte layer 6c to be obtained by electrolytic polymerization was formed in the following manner. First, the anode 4 provided with the intermediate layer 6b formed on its outermost surface was dipped in an aqueous solution containing about 3.2 mol/l of EDOT or Py and about 0.2 mol/l of naphthalenesulfonic acid and voltage was applied to the anode 4 to thereby make about 0.5 mA current flow for about 5 hours. This results in the formation of the second electrolyte layer 6c including PEDOT or PPy on the intermediate layer 6b.

Solid electrolytic capacitors A6 to A10 having the same structures as the solid electrolytic capacitors A1 to A5 respectively were manufactured except that the intermediate layer 6b was not formed but the second electrolyte layer 6c was directly formed on the first electrolyte layer 6a.

Next, the produced solid electrolytic capacitors A1 to A10 were subjected to ESR measurement made at a frequency of about 100 kHz. The ESR measurement was made using an LCR meter by applying voltage across the anode terminal 7 and the cathode terminal 9. The results are shown in Table 1. In Table 1, the result of measurement of each solid electrolytic capacitor was indicated by a relative value obtained when the value of the solid electrolytic capacitor A6 was standardized as 100.

TABLE 1

|     | Anode 4 | Dielectric Layer 5 | First Electrolyte Layer 6a | Intermediate Layer 6b | Second Electrolyte Layer 6c | ESR |
|-----|---------|--------------------|----------------------------|-----------------------|-----------------------------|-----|
| A1  | Ta      | Ta Oxide           | PEDOT                      | APTES                 | PPy                         | 74  |
| A2  | Ta      | Ta Oxide           | PPy                        | APTES                 | PPy                         | 82  |
| A3  | Ta      | Ta Oxide           | PEDOT                      | APTES                 | PEDOT                       | 78  |
| A4  | Ta      | Ta Oxide           | PPy                        | APTES                 | PEDOT                       | 80  |
| A5  | Nb      | Nb Oxide           | PEDOT                      | APTES                 | PPy                         | 76  |
| A6  | Ta      | Ta Oxide           | PEDOT                      | —                     | PPy                         | 100 |
| A7  | Ta      | Ta Oxide           | PPy                        | —                     | PPy                         | 104 |
| A8  | Ta      | Ta Oxide           | PEDOT                      | —                     | PEDOT                       | 102 |
| A9  | Ta      | Ta Oxide           | PPy                        | —                     | PEDOT                       | 104 |
| A10 | Nb      | Nb Oxide           | PEDOT                      | —                     | PPy                         | 104 |

As shown in Table 1, the solid electrolytic capacitors A1 to A5 each have a smaller ESR than each of the solid electrolytic capacitors A6 to A10 provided with no intermediate layer 6b made from organic silane. It has been found from this fact that ESR is decreased by forming the intermediate layer 6b including organic silane between the first electrolyte layer 6a and the second electrolyte layer 6c.

Experiment 2

In Experiment 2, solid electrolytic capacitors B1 to B5 each having the same structure as the solid electrolytic capacitor A1 were produced except that as the intermediate layer 6b, octadecyltriethoxysilane (OTES), n-propyltrichlorosilane (nPTCS), dimethoxydiphenylsilane (DMDPS), methylphenyldichlorosilane (MPDCS) or mercaptopropyltrimethoxysilane (MPTMS) was used in place of APTES.

Each intermediate layer 6b of the solid electrolytic capacitors B1 to B5 was formed in the same manner as in the process of manufacturing the solid electrolytic capacitor A1 except that the first electrolytic layer 6a was dipped in an aqueous solution containing about 0.002 wt % of each of OTES, nPTCS, DMDPS, MPDCS and MPTMS instead of dipping the first electrolyte layer 6a in the aqueous solution containing about 0.002 wt % of APTES.

Then, the produced solid electrolytic capacitors B1 to B5 were subjected to ESR measurement made at a frequency of about 100 kHz. The ESR measurement was made using an LCR meter by applying voltage across the anode terminal 7 and the cathode terminal 9. The results are shown in Table 2. In Table 2, the result of measurement of each solid electrolytic capacitor was indicated by a relative value obtained when the value of the solid electrolytic capacitor A6 was standardized as 100.

TABLE 2

|    | Intermediate Layer 6b | ESR  |
|----|-----------------------|------|
| B1 | OTES                  | 79.9 |
| B2 | nPTCS                 | 77.7 |
| B3 | DMDPS                 | 75.5 |
| B4 | MPDCS                 | 77.7 |
| B5 | MPTMS                 | 74.7 |
| A1 | APTES                 | 74   |

As shown in Table 2, the solid electrolytic capacitors B1 to B5 each have a smaller ESR than each of the solid electrolytic capacitors A6 to A10 provided with no intermediate layer 6b made of organic silane similarly to the case of the solid electrolytic capacitor A1. It has been found from this fact that ESR is decreased by forming the intermediate layer 6b including at least one organic silane selected from the group consisting of APTES, OTES, nPTCS, DMDPS, MPDCS and MPTMS between the first electrolyte layer 6a and the second electrolyte layer 6c. Also, particularly, the intermediate layer 6b is preferably constituted of at least one organic silane selected from the group consisting of APTES, DMDPS and MPTMS.

Second Embodiment

Figure 2:
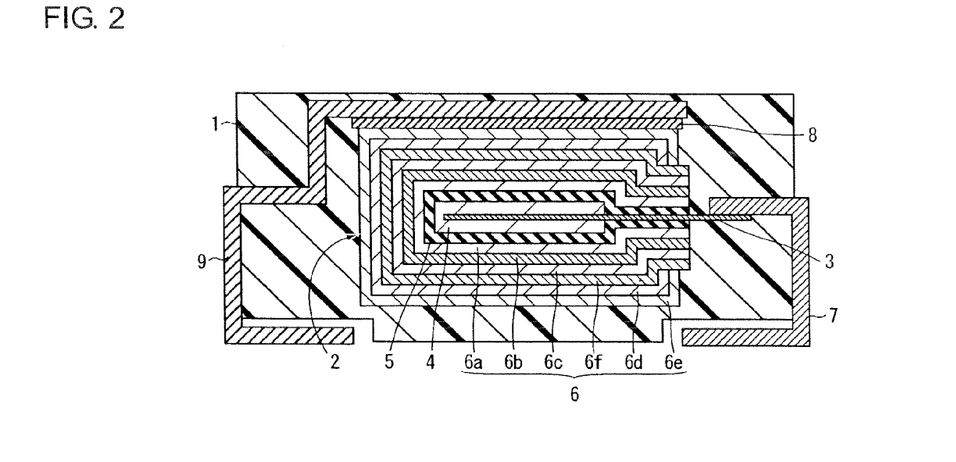
FIG. 2 is a sectional view for explaining the structure of the solid electrolytic capacitor according to a second embodiment of the present invention.

FIG. 2 is a sectional view for explaining the structure of the solid electrolytic capacitor according to a second embodiment of the present invention. The structure and production process of the solid electrolytic capacitor according to the second embodiment of the present invention will be explained with reference to FIG. 2. In FIG. 2, the same parts as those used in FIG. 1 are designated by the same symbols and explanations of these parts are omitted here.

In the solid electrolytic capacitor according to the second embodiment of the present invention, an intermediate layer 6f containing organic silane such as APTES is formed between the second electrolyte layer 6c and the first conductive layer 6d as shown in FIG. 2. In this case, the intermediate layer 6f containing organic silane is formed by dipping treatment carried out in a solution containing organic silane such as APTES in the same manner as in the case of the intermediate layer 6b.

Then, the solid electrolytic capacitor according to the second embodiment of the present invention has the same structure as the solid electrolytic capacitor according to the first embodiment except for the above.

Third Embodiment

Figure 3:
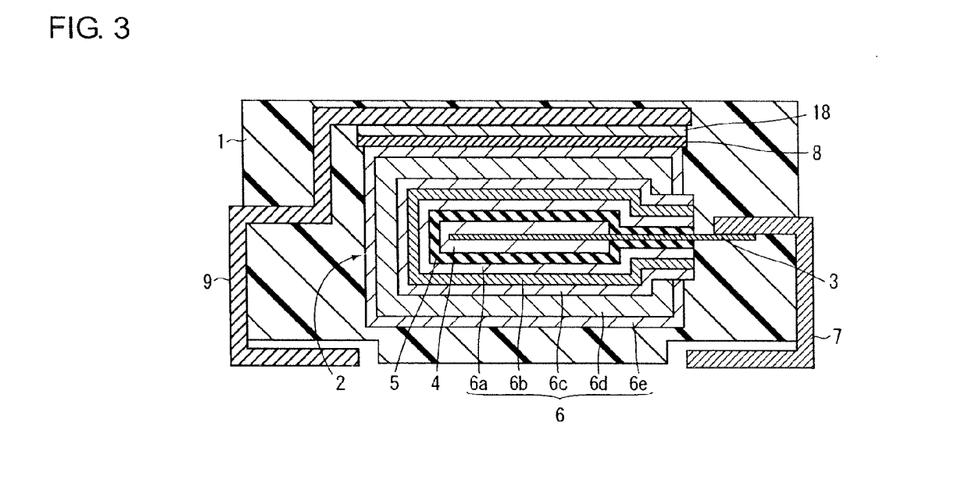
FIG. 3 is a sectional view for explaining the structure of the solid electrolytic capacitor according to a third embodiment of the present invention.

FIG. 3 is a sectional view for explaining the structure of the solid electrolytic capacitor according to a third embodiment of the present invention. The structure and production process of the solid electrolytic capacitor according to the third embodiment of the present invention will be explained with reference to FIG. 3. In FIG. 3, the same parts as those used in FIG. 1 are designated by the same symbols and explanations of these parts are omitted here.

In the solid electrolytic capacitor according to the third embodiment of the present invention, an intermediate layer 18 containing organic silane such as APTES is formed between the third conductive layer 8 and the cathode terminal 9 as shown in FIG. 3. The intermediate layer 18 containing organic silane is formed by dipping treatment carried out in a solution containing organic silane such as APTES in the same manner as in the case of the intermediate layer 6b.

Then, the solid electrolytic capacitor according to the third embodiment of the present invention has the same structure as the solid electrolytic capacitor according to the first embodiment except for the above.

Fourth Embodiment

Figure 4:
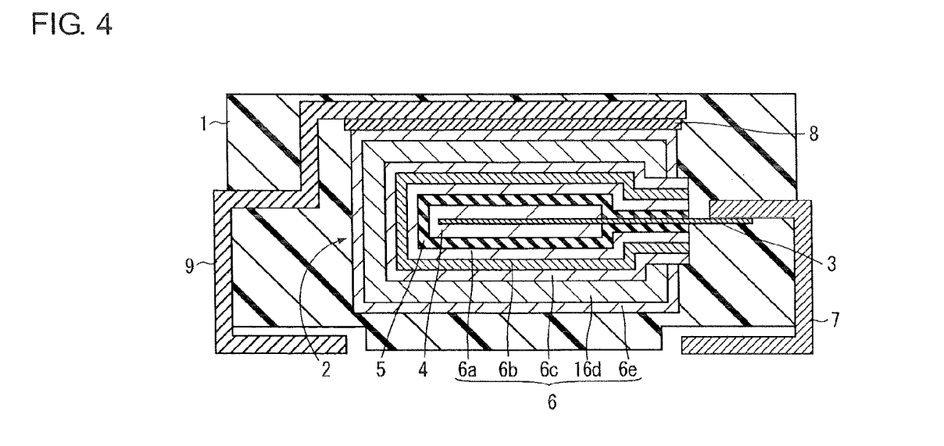
FIG. 4 is a sectional view for explaining the structure of the solid electrolytic capacitor according to a fourth embodiment of the present invention.

FIG. 4 is a sectional view for explaining the structure of the solid electrolytic capacitor according to a fourth embodiment of the present invention. The structure and production process of the solid electrolytic capacitor according to the fourth embodiment of the present invention will be explained with reference to FIG. 4. In FIG. 4, the same parts as those used in FIG. 1 are designated by the same symbols and explanations of these parts are omitted here.

In the solid electrolytic capacitor according to the fourth embodiment of the present invention, a first conductive layer 16d containing carbon particles and organic silane such as APTES is formed on the second electrolyte layer 6c as shown in FIG. 4.

The first conductive layer 16d containing organic silane and carbon particles is formed in the following manner. First, carbon particles, water and a binder were mixed in a fixed ratio by weight and organic silane such as APTES is added to prepare an aqueous solution. Then, the anode 4 provided with the intermediate layer 6f formed on its outermost surface was dipped in the aqueous solution containing organic silane and carbon particles. Then, the anode 4 was taken out of the solution and dried. Thus, the first conductive layer 16d containing organic silane such as APTES and carbon particles was formed on the intermediate layer 6f.

Then, the solid electrolytic capacitor according to the fourth embodiment of the present invention has the same structure as the solid electrolytic capacitor according to the first embodiment except for the above.

Fifth Embodiment

Figure 5:
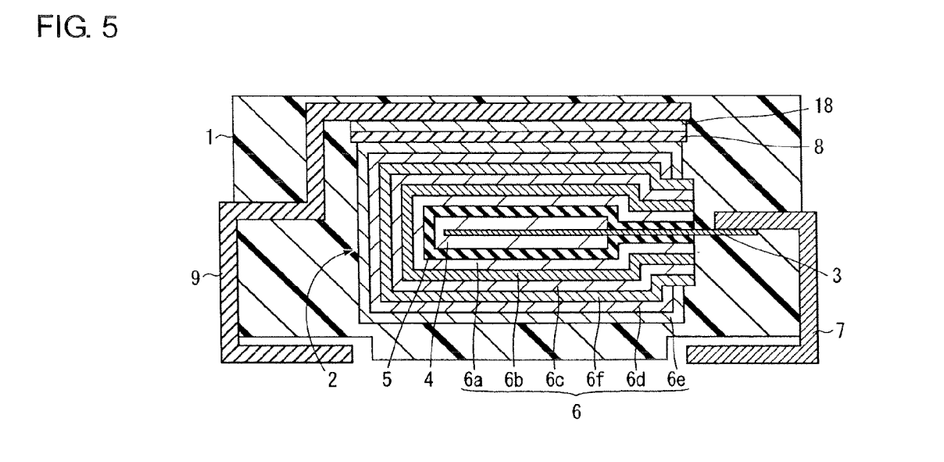
FIG. 5 is a sectional view for explaining the structure of the solid electrolytic capacitor according to a fifth embodiment of the present invention.

FIG. 5 is a sectional view for explaining the structure of the solid electrolytic capacitor according to a fifth embodiment of the present invention. The structure and production process of the solid electrolytic capacitor according to the fifth embodiment of the present invention will be explained with reference to FIG. 5. In FIG. 5, the same parts as those used in FIG. 1 are designated by the same symbols and explanations of these parts are omitted here.

In the solid electrolytic capacitor according to the fifth embodiment of the present invention, the intermediate layer 6f and the intermediate layer 18 containing organic silane such as APTES are formed between the second electrolyte layer 6c and the first conductive layer 6d and between the third conductive layer 8 and the cathode terminal 9 respectively as shown in FIG. 5.

Then, the solid electrolytic capacitor according to the fifth embodiment of the present invention has the same structure as the solid electrolytic capacitor according to the first embodiment except for the above.

Sixth Embodiment

Figure 6:
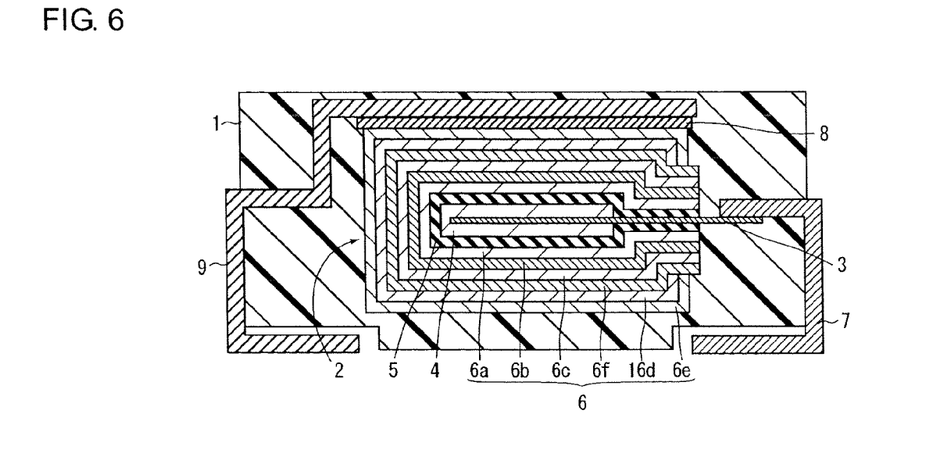
FIG. 6 is a sectional view for explaining the structure of the solid electrolytic capacitor according to a sixth embodiment of the present invention.

FIG. 6 is a sectional view for explaining the structure of the solid electrolytic capacitor according to a sixth embodiment of the present invention. The structure and production process of the solid electrolytic capacitor according to the sixth embodiment of the present invention will be explained with reference to FIG. 6. In FIG. 6, the same parts as those used in FIG. 1 are designated by the same symbols and explanations of these parts are omitted here.

In the solid electrolytic capacitor according to the sixth embodiment of the present invention, the first conductive layer 16d contains carbon particles and organic silane such as APTES as shown in FIG. 6. Also, the intermediate layer 6f containing organic silane such as APTES is formed between the second electrolyte layer 6c and the first conductive layer 16d.

Seventh Embodiment

Figure 7:
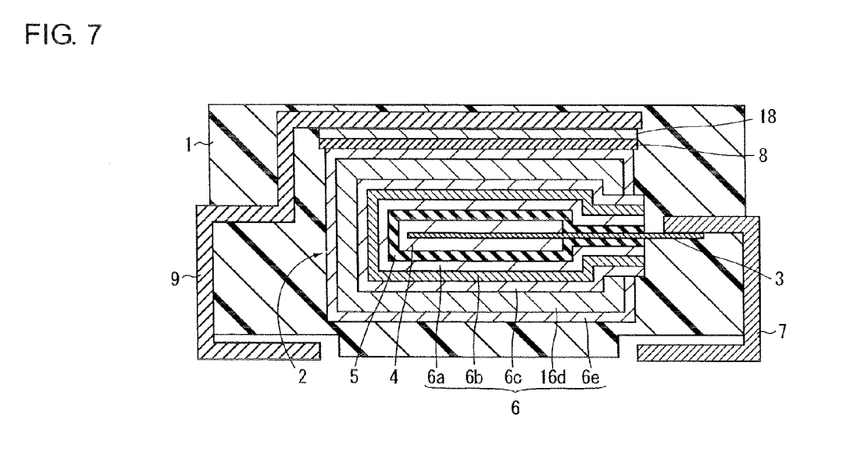
FIG. 7 is a sectional view for explaining the structure of the solid electrolytic capacitor according to a seventh embodiment of the present invention.

FIG. 7 is a sectional view for explaining the structure of the solid electrolytic capacitor according to a seventh embodiment of the present invention. The structure and production process of the solid electrolytic capacitor according to the seventh embodiment of the present invention will be explained with reference to FIG. 7. In FIG. 7, the same parts as those used in FIG. 1 are designated by the same symbols and explanations of these parts are omitted here.

In the solid electrolytic capacitor according to the seventh embodiment of the present invention, the intermediate layer 18 containing organic silane such as APTES is formed between the third conductive layer 8 and the cathode terminal 9 as shown in FIG. 7. Also, the first conductive layer 16d containing carbon particles and organic silane such as APTES is formed on the second electrolyte layer 6c.

Eighth Embodiment

Figure 8:
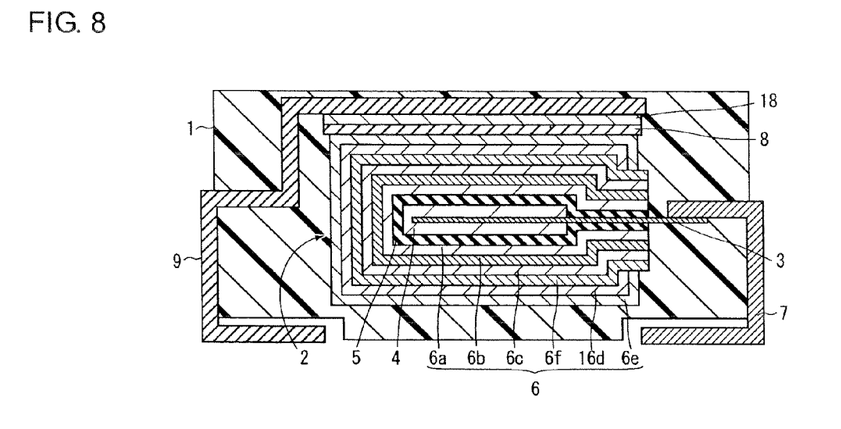
FIG. 8 is a sectional view for explaining the structure of the solid electrolytic capacitor according to an eighth embodiment of the present invention.

FIG. 8 is a sectional view for explaining the structure of the solid electrolytic capacitor according to an eighth embodiment of the present invention. The structure and production process of the solid electrolytic capacitor according to the eighth embodiment of the present invention will be explained with reference to FIG. 8. In FIG. 8, the same parts as those used in FIG. 1 are designated by the same symbols and explanations of these parts are omitted here.

In the solid electrolytic capacitor according to the eighth embodiment of the present invention, the first conductive layer 16*d* contains carbon particles and organic silane such as APTES as shown in FIG. 8. The intermediate layer 6*f* and the intermediate layer 18 containing organic silane such as APTES are formed between the second electrolyte layer 6*c* and the first conductive layer 16*d* and between the third conductive layer 8 and the cathode terminal 9 respectively.

In the solid electrolytic capacitors according to the above second to eighth embodiments, the intermediate layers 6*f* and 18 containing organic silane are also formed between the second electrolyte layer 6*c* and the first conductive layer 6*d* or 16*d* and between the third conductive layer 8 and the cathode terminal 9 and further, organic silane is contained also in the first conductive layer 16*d*, which further reduces contact resistance between these layers. This makes it possible to reduce ESR in a high-frequency range.

Then, solid electrolytic capacitors were produced according to the above second to eighth embodiments and evaluated.

Experiment 3

In Experiment 3, solid electrolytic capacitors C1 to C7 each having the structure shown in Table 3 were produced. Other structures are the same as those of the solid electrolytic capacitor A1.

Here, the intermediate layers 6*f* and 18 including APTES were each formed in the same method as in the case of the intermediate layer 6*b* including APTES and formed between the first electrolyte layer 6*a* and the second electrolyte layer 6*c* in the formation of the solid electrolytic capacitor A1 in Experiment 1.

Also, the first conductive layer 16*d* containing carbon particles and APTES was formed in the following manner. First, carbon particles, water and a binder were mixed in a ratio by weight of about 1:about 10:about 0.0005. Also, an aqueous solution was prepared in which APTES was added in an amount of about 1.1 wt % based on the total amount of APTES and carbon particles. Then, the anode 4 provided with the intermediate layer 6*f* formed on its outermost surface was dipped in the aqueous solution containing organic silane and carbon particles. Then, the anode 4 was taken out of the solution and dried. Thus, the first conductive layer 16*d* containing organic silane such as APTES and carbon particles was formed on the intermediate layer 6*f*.

Also, solid electrolytic capacitors C8 to C11 having the same structures as the solid electrolytic capacitors C4 to C7 respectively were manufactured except that the intermediate layer 6*b* was not formed but the second electrolyte layer 6*c* was directly formed on the first electrolyte layer 6*a*.

Then, the produced solid electrolytic capacitors C1 to C11 were subjected to ESR measurement made at a frequency of about 100 kHz. The ESR measurement was made using an LCR meter by applying voltage across the anode terminal 7 and the cathode terminal 9. The results are shown in Table 3.

In Table 3, the result of measurement of each solid electrolytic capacitor was indicated by a relative value obtained when the value of the solid electrolytic capacitor A6 was standardized as 100.

TABLE 3

| | Intermediate Layer 6b | Intermediate Layer 6f | Organic Silane in First Conductive Layers 6d and 16d | Intermediate Layer 18 | ESR |
|---|---|---|---|---|---|
| C1 | APTES | APTES | — | — | 68 |
| C2 | APTES | — | — | APTES | 65 |
| C3 | APTES | — | APTES | — | 68 |
| C4 | APTES | APTES | — | APTES | 63 |
| C5 | APTES | APTES | APTES | — | 68 |
| C6 | APTES | — | APTES | APTES | 63 |
| C7 | APTES | APTES | APTES | APTES | 60 |
| C8 | — | APTES | — | APTES | 72 |
| C9 | — | APTES | APTES | — | 74 |
| C10 | — | — | APTES | APTES | 72 |
| C11 | — | APTES | APTES | APTES | 70 |

As shown in Table 3, the solid electrolytic capacitors C1 to C11 each have a smaller ESR than each of the solid electrolytic capacitors A6 to A10.

The foregoing embodiments and examples disclosed above are illustrative and should not be interpreted as restrictive in all points. The scope of the invention is defined by the appended claims rather than by the descriptions of the above embodiments and examples, and embraces all changes that fall within meets and bounds of the claims, or equivalence of such meets and bounds.

Also, the anode 4 may be constituted of other valve metals such as aluminum or titanium besides tantalum and niobium or may use an alloy containing these valve metals. Also, as to the shape of the anode 4, a foil shape or plate shape may be used in addition to the form of a porous sintered body.

Also, the first electrolyte layer 6*a* and the second electrolyte layer 6*c* may be constituted of, other than PEDOT and PPy, other conductive polymers such as polyaniline or may contain two or more of these conductive polymers.

Also, the intermediate layers 6*b*, 6*f* and 18 may be constituted of other methyl type silane, phenyl type silane, vinyl type silane, alkoxysilane, mercapto type silane or amino type silane or may contain two or more of these organic silanes. Also, the intermediate layers 6*b*, 6*f* and 18 may be formed by sticking an aqueous solution containing organic silane by other methods such as spraying, followed by drying.

Also, the first conductive layer 16*d* may contain other methyl type silane, phenyl type silane, vinyl type silane, alkoxy silane, mercapto type silane and amino type silane, or may contain two or more of these organic silanes.

What is claimed is:

1. A solid electrolytic capacitor comprising:
an anode;
a dielectric layer formed on said anode; and
a cathode formed on said dielectric layer, wherein;
said cathode is provided with:
a first electrolyte layer formed on said dielectric layer and containing a conductive polymer;
an intermediate layer formed on said first electrolyte layer and consisting of organic silane; and a second electrolyte layer formed on said intermediate layer and containing a conductive polymer, wherein said intermediate layer is not brought into contact with said dielectric layer.

2. The solid electrolytic capacitor according to claim 1, wherein said intermediate layer contains at least one organic silane selected from the group consisting of aminopropyltriethoxysilane, octadecyltriethoxysilane, n-propyltrichlorosilane, dimethoxydiphenylsilane, methylphenyldichlorosilane and mercaptopropyltrimethoxysilane.

3. The solid electrolytic capacitor according to claim 1 or 2, wherein said first electrolyte layer contains polyethylenedioxythiophene; and said second electrolyte layer contains polypyrrole.

4. The solid electrolytic capacitor according to claim 1, wherein said first electrolyte layer is formed so as to substantially cover the entire surface of said dielectric layer.

* * * * *